(12) United States Patent
Takeda et al.

(10) Patent No.: US 9,582,957 B2
(45) Date of Patent: Feb. 28, 2017

(54) ELECTRONIC PAYMENT SYSTEM FOR AUTOMATED MACHINE

(71) Applicant: JAPAN CASH MACHINE CO., LTD., Osaka (JP)

(72) Inventors: Takayuki Takeda, Tokyo (JP); Yasumasa Suzuki, Tokyo (JP); Koji Kuroiwa, Tokyo (JP); Yuichiro Tsutsui, Tokyo (JP)

(73) Assignee: Japan Cash Machine Co., Ltd., Osaka (JP)

( * ) Notice: Subject to any disclaimer, the term of this patent is extended or adjusted under 35 U.S.C. 154(b) by 0 days.

(21) Appl. No.: 13/644,352

(22) Filed: Oct. 4, 2012

(65) Prior Publication Data

US 2013/0085943 A1    Apr. 4, 2013

(30) Foreign Application Priority Data

Oct. 4, 2011  (JP) .................................. 2011-220456

(51) Int. Cl.
*G07F 17/32* (2006.01)
*G06Q 20/18* (2012.01)
(Continued)

(52) U.S. Cl.
CPC ............. *G07F 17/32* (2013.01); *G06Q 20/18* (2013.01); *G06Q 20/322* (2013.01);
(Continued)

(58) Field of Classification Search
CPC ..... G06Q 20/10; G06Q 20/105; G06Q 20/108
See application file for complete search history.

(56) References Cited

U.S. PATENT DOCUMENTS

| | | |
|---|---|---|
| 6,264,556 B1 | 7/2001 | Izawa et al. |
| 2002/0161703 A1 | 10/2002 | Okamoto et al. |
| 2002/0188575 A1 | 12/2002 | Freeny |
| 2004/0238319 A1 | 12/2004 | Hand et al. |
| 2006/0054687 A1 | 3/2006 | Betti et al. |

(Continued)

FOREIGN PATENT DOCUMENTS

| | | |
|---|---|---|
| EP | 1160744 A2 | 12/2001 |
| JP | 8280913 | 10/1996 |

(Continued)

OTHER PUBLICATIONS

International Search Report for PCT/JP2012/006355, dated Nov. 13, 2012.

(Continued)

*Primary Examiner* — Abhishek Vyas
*Assistant Examiner* — Liz P Nguyen
(74) *Attorney, Agent, or Firm* — Bachman & LaPointe, PC

(57) ABSTRACT

An electronic payment system is provided to comprise a mobile terminal 10 for emitting a remotely operable signal, a communications device 5 connected to an automated machine 1 for receiving remotely operable signal emitted from mobile terminal 10, and an automatic payment device 6 linked to a financial database 7. Communications device 5 retrieves from remotely operable signal an account number of a holder of the account at financial database 7. Payment device 6 receives a monetary signal indicative of a transaction fee, withdraws the amount of transaction fee from the correct holder's account to produce an authorization signal to communications device 5 that drives automated machine 1 without credit transaction.

5 Claims, 4 Drawing Sheets

(51) Int. Cl.
*G06Q 20/32* (2012.01)
*G07F 7/04* (2006.01)
*G07F 19/00* (2006.01)

(52) U.S. Cl.
CPC ............ *G06Q 20/327* (2013.01); *G07F 7/04* (2013.01); *G07F 17/3244* (2013.01); *G07F 19/20* (2013.01)

(56) References Cited

U.S. PATENT DOCUMENTS

| | | | |
|---|---|---|---|
| 2007/0099696 | A1 | 5/2007 | Nguyen et al. |
| 2008/0045314 | A1* | 2/2008 | Okada ................ G07F 17/3267 463/20 |
| 2008/0048973 | A1* | 2/2008 | McKay ......................... 345/156 |
| 2009/0210258 | A1* | 8/2009 | Cardot et al. ..................... 705/4 |
| 2009/0307491 | A1 | 12/2009 | Nakatsugawa et al. |
| 2010/0174650 | A1 | 7/2010 | Nonaka |
| 2011/0238573 | A1 | 9/2011 | Varadarajan |
| 2012/0047068 | A1 | 2/2012 | Kanisawa et al. |

FOREIGN PATENT DOCUMENTS

| | | | | |
|---|---|---|---|---|
| JP | 09138851 | | 5/1997 | |
| JP | 11253609 | A | 9/1999 | |
| JP | 2002000922 | A | 1/2002 | |
| JP | 2002078953 | A | 3/2002 | |
| JP | 2003316959 | A | 11/2003 | |
| JP | 2005100429 | A | 4/2005 | |
| JP | 2006127390 | A | 5/2006 | |
| JP | 2007151706 | A | 6/2007 | |
| JP | 2008257518 | | 10/2008 | |
| JP | 2009265991 | A | 11/2009 | |
| JP | 2010262389 | * | 11/2010 | |
| JP | 2010262389 | A * | 11/2010 | ............. G06Q 20/00 |
| TW | 201012164 | A | 3/2010 | |

OTHER PUBLICATIONS

Japanese Official Action for Application No. 2012-221694, dated Apr. 22, 2014.
Taiwanese Office action for Application No. 101136669 dated Feb. 10, 2015.
Japanese Office action for Application No. 2014-128453 dated Jun. 23, 2015.
Japanese Office action for Application No. 2014-128543 dated Jun. 23, 2015.
Supplementary European Search Report for Application No. EP 12838169.6 dated Apr. 24, 2015.

\* cited by examiner

ELECTRONIC PAYMENT SYSTEM FOR AUTOMATED MACHINE

TECHNICAL FIELD

This invention relates to an electronic payment system for receiving a remotely operable signal transmitted from a mobile terminal such as a cell phone to operate an automated machine such as a gaming machine by real-time electronic payment transaction without credit transaction.

BACKGROUND OF THE INVENTION

In countries such as the U.S. that authorizes casino-owning business, players can enjoy games with gaming machines while paying cash for games in casinos or game halls. Some of known gaming machines usually have a bill acceptor for example as shown in U.S. Pat. No. 6,264,556 (Document 1). In another aspect, Japanese Patent Disclosure No. 2009-265991 (Document 2) demonstrates an electronic settlement system in game halls such as amusement arcades.

The gaming machine shown in Document 1 comprises a button panel including a display and a user interface area for allowing an operator to play a game of chance, a bill acceptor incorporated into the machine for accepting and validating currency to credit the user with a corresponding number of play credits for the gaming apparatus, and a note dispenser for dispensing currency as payout for successful play.

The electronic settlement system exhibited in Document 2 comprises a plurality of terminal systems each electrically connected to corresponding one of a plurality of gaming machines provided in amusement arcades to handle transaction fee information in terminal systems, and a payment device communicated with the terminal systems through a communication network to electronically pay playing fees in gaming machines from terminal systems. Each terminal system comprises a card processor for rewriting squared information stored in an IC (integrated circuit) card for settlement and a settlement controller for establishing a telecommunication with the payment device to send and receive squared information between the card processor and settlement controller in accordance with command signals from the electronic settlement device and to give a gaming machine a permission of the utilization when receiving a notice of settlement completion from the payment device. The payment device comprises a signal processor for making settlement based on squared information read from IC card through a terminal system and for writing new squared information on the IC card through the terminal system upon completion of payment process, a settlement communicator for sending a settlement signal of the payment to the terminal system, and a processing communicator for sending processed information on settlement process to a superior settlement system through a communication route except the communication network.

Meanwhile, a known debit card is a plastic card that allows the cardholder electronic access to his or her bank account at a financial institution. Some cards have a stored value for payment by withdrawing funds from a designated account in favor of the designated payee's bank account. The card can be used as an alternative payment method to cash when making purchases. In some cases, the primary account number is assigned for use on the Internet. Unlike credit and charge cards, a debit card makes it possible to make an immediate payment to a payee from the cardholder's designated bank account. Debit cards usually also allow for instant withdrawal of cash, acting as the ATM card for withdrawing cash.

However, until now, no one has ever presented an electronic payment system for an automated machine that may offer services or goods to provide real-time electronic payment transactions. On the other side, there would be a need for providing an electronic payment system that enables to drive an automated machine such as a gaming machine at the same time as reception and electronic settlement of a transaction fee signal received from a cell phone.

An object of the present invention is to provide an electronic payment system capable of making electronic spot settlement for transaction between a user who pays electronic money and the system for driving an automated machine. Another object of the present invention is to provide an electronic payment system applied to a gaming machine for presenting games. Still another object of the present invention is to provide a gaming machine capable of selecting either electronic or cash payment for gaming.

SUMMARY OF THE INVENTION

The electronic payment system according to the present invention comprises a mobile terminal (10) for emitting a remotely operable signal, a communications device (5) connected to an automated machine (1) for receiving remotely operable signal emitted from mobile terminal (10), and an automatic payment device (6) linked to a financial database (7). Communications device (5) receives a monetary signal indicative of a transaction fee necessary to drive automated machine (1) simultaneously with, before or after receiving remotely operable signal to retrieve from remotely operable signal an account number that identifies a holder of the account at financial database (7) and the monetary signal if contained in remotely operable signal. Automatic payment device (6) receives the holder's account number signal and the amount of the transaction fee received from communications device (5) and withdraws the amount of the transaction fee from the correct holder's account at financial database (7) to produce an authorization signal to communications device (5) that produces monetary signal to drive automated machine (1). This system is very convenient because users can obtain goods or services from automated machine (1) by the real-time electronic payment for transaction between a user who pays electronic money and the system of the present invention for driving an automated machine, while an operator of the automated machine can surely receive an immediate payment without credit transaction. Accordingly, users without cash can emit a remotely operable signal from a mobile terminal to the system of the invention that automatically makes settlement to drive the automated machine.

BRIEF DESCRIPTION OF THE DRAWINGS

The above-mentioned and other objects and advantages of the present invention will be apparent from the following description in connection with the accompanying drawings showing gaming machines as preferred embodiments of the electronic payment system of the invention wherein.

BEST MODE FOR CARRYING OUT THE INVENTION

Figure 1:
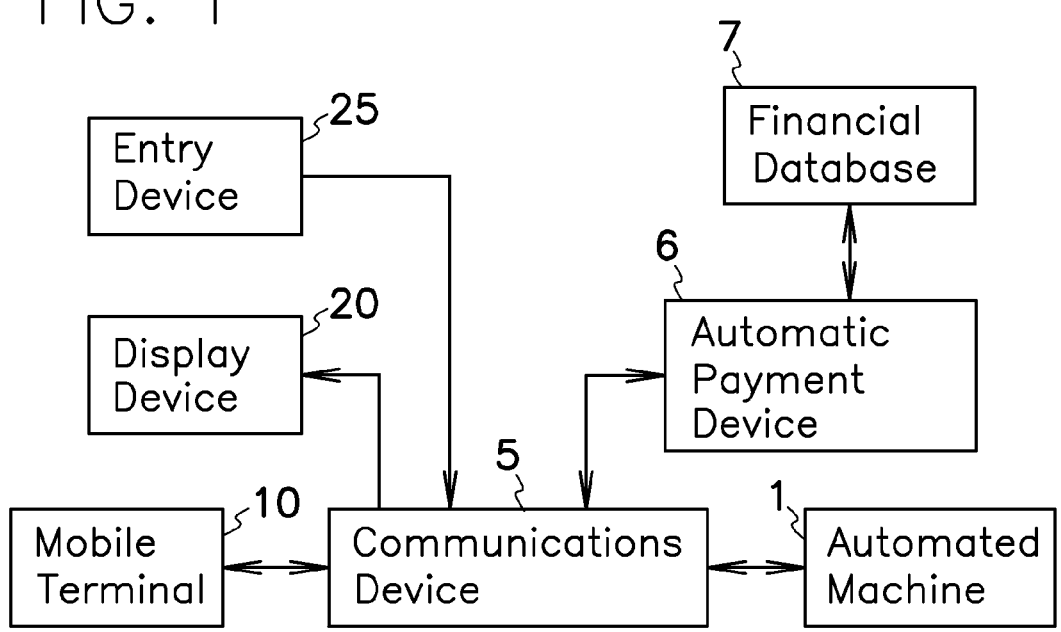
FIG. 1 is a schematic diagram showing a basic concept of the electronic payment system according to the present invention.

FIG. 1 shows the basic concept of the electronic payment system according to the present invention that comprises a mobile terminal 10 for emitting a remotely operable signal that may include information on a specific or unique account number or debit card number of a financial database 7 that identifies a holder of the account. The system also comprise a communications device 5 connected to an automated machine 1 for receiving remotely operable signal emitted from mobile terminal 10. Communications device 5 may also receive a monetary signal indicative of a transaction fee necessary to drive automated machine 1 simultaneously with, before or after receiving remotely operable signal. When remotely operable signal contains monetary signal, communications device 5 may receive the information of account number and monetary signal contained in remotely operable signal from mobile terminal 10. Alternatively, monetary signal may be produced and transmitted to communications device 5 by another signal input device such as an entry device 25 as mentioned below. A holder of the financial account usually is a same person that owns the mobile terminal, however, may be a different person from the owner of the mobile terminal.

Then, communications device 5 may retrieve holder's account number of financial database 7 and monetary signal if they are contained in remotely operable signal. The system may also comprise an automatic payment device 6 linked to financial database 7 for receiving from communications device 5 holder's account number signal of financial database 7 and monetary signal of transaction fee and for withdrawing an amount of transaction fee from the correct holder's account at financial database 7 to produce an authorization signal if the received account number is correct and the amount of transaction fee is within a deposit balance of the account. Receiving authorization signal, communications device 5 produces monetary signal to automated machine 1 to drive it at the amount equivalent to a value of received monetary signal.

Mobile terminal 10 may emit a remotely operable signal such as a radio or wireless signal or an optical beam signal of infrared, ultraviolet or visible ray, etc. to receive remotely operable signal by communications device 5. Mobile terminal 10 and communications device 5 are electrically connected to each other through wired or wireless mutual communication means for radio or optical connection. Mobile terminal 10 also may include a cellular phone, a smart phone utilizing wireless application protocol (WAP), personal digital assistant (PDA), portable computer, or a hand held computer for electronic payment through the debit or prepaid card transaction system. Debit card transaction systems may include J-Debit, VISADebit and Debit Master. Prepaid card transaction systems may include Eddy, Suica, PASMO, nanaco, and WAON. The aforementioned systems and devices are exemplary and mobile terminal 10 may comprise ones for other electronic payment systems or devices. Also, mobile terminal 10 may be an electronic computer terminal or an IC card that incorporates a built-in non-contact IC chip such as for example FeliCa (Registered Mark), MIFARE (Registered Mark) or NFC (Near Field Communication) chips.

Mobile terminal 10 comprises memory means 34 such as a memory card or flash memory in cellular phone for storing code information that includes an account number of a holder's debit or prepaid card, PIN (Personal Identification Number) and/or ID (Identification) number, entry means 31 such as a numerical keypad or keyboard in cellular phone for inputting an amount of a transaction fee signal such as gaming fees into memory means 34, a CPU 35 electrically connected to all means for preparing a remotely operable signal inclusive of the code information stored from memory means 34, transmission means 32 for transmitting remotely operable signal from CPU 35 to communications device 5, reception means 33 for receiving a deal signal from communications device 5 when communications device 5 transmits to mobile terminal 10 the deal signal produced by communications device 5, and battery means (not shown) for supplying electric power to each means to perform reading, writing, transmitting and receiving functions in mobile terminal 10. Memory means 34 does not need to store the code information for enhancement in security if any code signals may be produced by entry means 31 and transmitted outside through transmission means 32. A single convertible transceiver means may be used for transmission and reception means 32, 33. CPU 35 may prepare remotely operable signal that contains an transaction fee signal and a code signal inclusive of account number of debit or prepaid card, PIN (Personal Identification Number) and/or ID (Identification) number.

There are a variety of automated machines for receiving transaction fee signal from communications device 5 may include automated teller machines, vending machines, money exchangers or other money-operated equipment or apparatus. The present invention adopts a gaming machine 1 as an example of automated machines, however, it would be apparent to ordinary skill in the art that the electronic payment system of the present invention can also apply to drive other automated machines in a similar way.

Communications device 5 and automatic payment device 6 are electrically linked to each other through wired, wireless or intranet connection, Internet or combination thereof. Payment device 6 and financial database 7 such as banking systems are linked to each other through wired, wireless, intranet connection, Internet or combination thereof. In embodiments of the present invention, communications device 5 may be disposed within, outside of or adjacent to gaming machine 1 so far as users may operate mobile terminal 10 to access communications device 5 in the vicinity of or at a location not too far away from gaming machine 1. Both communications device 5 and payment device 6 may be disposed within or outside of gaming machine 1 for any spatial reason, so far as users may easily access gaming machine 1 and operate communications device 5. For a similar reason, one of communications device 5 and payment device 6 may be disposed within or outside of gaming machine 1 so far as they may be electrically linked each other.

Communications device 5 comprises a signal processor 5b connected to automated machine 1 for retrieving and producing an account number that identifies a holder of the account at financial database 7 and if necessary holder's PIN and/or ID numbers and monetary signals from remotely operable signal received from mobile terminal 10, and a communications interface 5a for intervening telecommunication between mobile terminal 10 and signal processor 5b.

Figure 2:
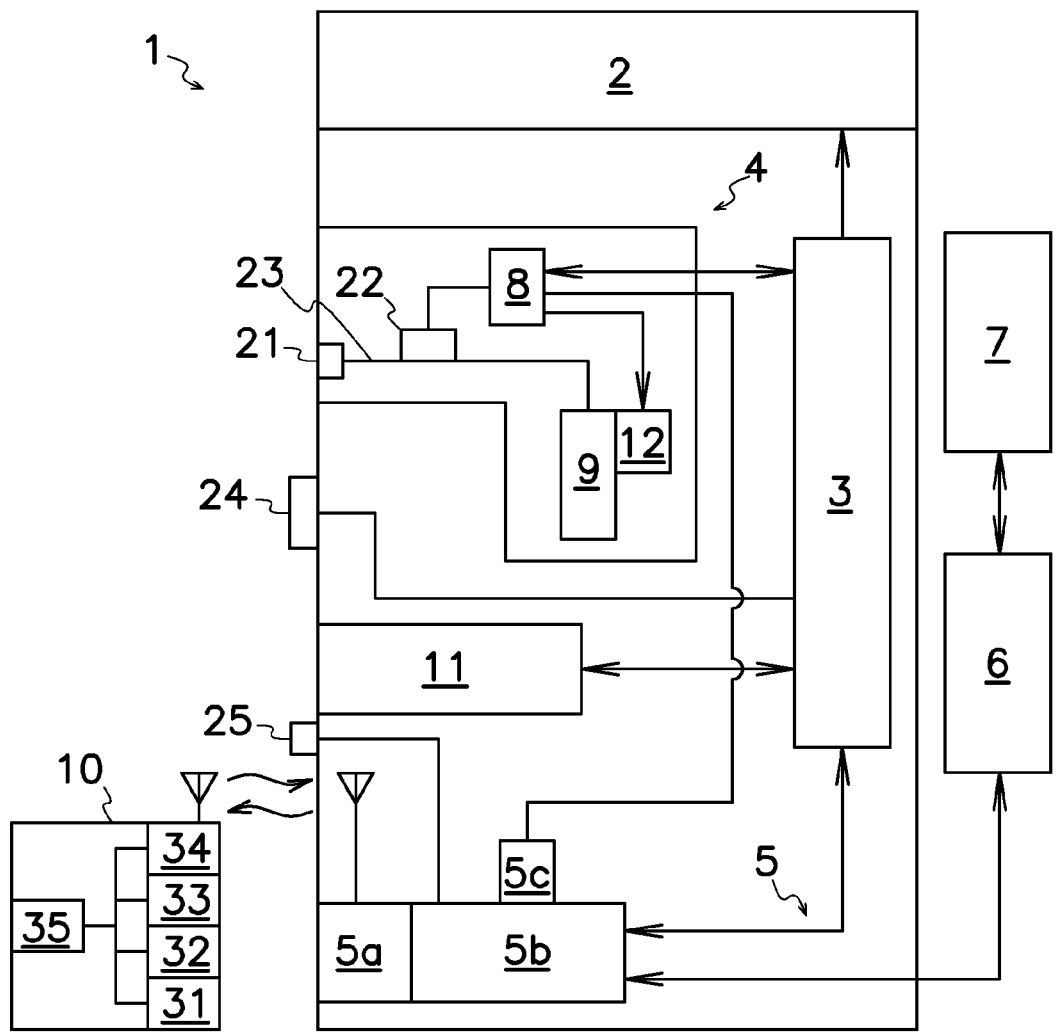
FIG. 2 is a schematic diagram showing a first embodiment of the gaming machine according to the present invention.

FIG. 2 illustrates a typical example of the automated machine applied to a schematically depicted gaming machine 1. Gaming machine 1 comprises a bill acceptor 4, a drive device 3 connected to communications device 5 and to gaming hardware 2 and a printer 11 for recording game information on a recording medium. Bill acceptor 4 validates a bill inserted from outside to produce a bill monetary signal to drive device 3 as a monetary signal of transaction fee when bill acceptor 4 decides that the inserted bill is genuine. Drive device 3 generates to gaming hardware 2 drive signals of the amount equivalent to a value of received monetary signal to present games when receiving each monetary signal from bill acceptor 4. Printer 11 prints on recording medium data of game information, money amount to be refunded and management codes to issue the recording medium as a coupon.

Bill acceptor 4 comprises an inlet sensor 21 for producing a detection signal when a bill is inserted into bill acceptor 4, a bill sensor 22 for producing a characteristic signal inclusive of an optical or magnetic signal when a bill is moved along bill sensor 22, a conveyor (not shown) for transporting a bill along a passageway 23 in bill acceptor 4 and a control device 8 for receiving detection signal from inlet sensor 21 and characteristic signal from bill sensor 22 to produce drive signals to conveyor when control device 8 considers the bill as being genuine. Specifically, control device 8 may verify whether or not the bill is genuine and what kind of denomination the bill has, and when it decides that the bill is genuine, control device 8 generates a denomination signal of the bill as a monetary signal to drive device 3. On the other hand, control device 8 also receives from communications device 5 monetary signal sent from mobile terminal 10, and so, transmits to drive device 3 either of monetary signals that bill acceptor 4 produces and relays from communications device 5. Control device 8 is electrically connected to a converter 5c of communications device 5 for converting denomination signal from signal processor 5b into a serial denomination signal and transmitting serial denomination signal to control device 8 of bill acceptor 4. Control device 8 has a memory area for storing a specific code identifying gaming machine 1 and also storing both monetary signals that bill acceptor 4 produces and relays from communications device 5. Otherwise, the present invention also contemplates that bill acceptor 4 may validate valuable coupon tickets, scrip, tender, tokens or substitutes of bills.

Bill acceptor 4 validates a bill inserted from outside to produce a monetary signal of the bill to drive device 3 when bill acceptor 4 decides that the inserted bill is genuine. Bill acceptor 4 also receives a monetary signal contained in remotely operable signal from signal processor 5b through converter 5c of communications device 5, and forwards monetary signal to drive device 3. Then, drive device 3 receives either of monetary signals from bill acceptor 4 to generate to gaming hardware 2 drive signals of the amount equivalent to a value of either received monetary signal to allow gaming hardware 2 to conduct a game. Each of monetary signals may indicate a money amount corresponding to one or more of denominations of bills optically or magnetically readable by bill acceptor 4. In other words, money amount to be transmitted may be selected from amounts in denominations of bills readable by bill acceptor 4. By way of example, when bill acceptor 4 can selectively validate bills of five kinds, i.e. one-dollar, five-dollar, ten-dollar, twenty-dollar or one hundred-dollar bills, it would be preferable to send signals of the amount selected from one-dollar, five-dollar, ten-dollar, twenty-dollar or one hundred-dollar bill from mobile terminal 10 to communications device 5.

Drive device 3 may generate to gaming hardware 2 drive signals of the amount equivalent to a value of the received monetary signal when receiving monetary signal through bill acceptor 4. Otherwise, communications device 5 may forward monetary signal of transaction fee directly to drive device 3 without bill acceptor 4 so that drive device 3 may produce to gaming hardware 2 drive signals of the amount equivalent to the amount of transaction fee to drive gaming hardware 2 by drive signals from drive device 3. This allows users to select either cash or cashless electronic payment for gaming in amusement halls or casinos.

Bill acceptor 4 also comprises a stacker 9 for accommodating bills considered genuine by control device 8, and a memory device 12 electrically connected to control device 8 and attached to stacker 9 for storing monetary or denomination signals, account number signals, PIN and ID number signals and specific code signal identifying gaming machine 1 forwarded from control device 8. Control device 8 distinctively stores in the memory area both monetary signals produced by control device 8 and transmitted from communications device 5. Memory device 12 distinctively stores both monetary signals transmitted from both control device 8 and communications device 5, account number signals, PIN and ID number signals and specific code signal identifying gaming machine 1 all forwarded from control device 8. Bill acceptor 4 is removably attached to gaming machine 1 and also stacker 9 is removably attached to bill acceptor 4 to easily take out and collect bills accumulated in stacker 9. Accordingly, when bills in stacker 9 are to be collected, bill acceptor 4 is detached from gaming machine 1 and then stacker 9 is removed from bill acceptor 4.

In operation, when mobile terminal 10 moves closer to communications device 5, it emits radio signal inclusive of the account number signal of financial database 7 identifying a holder of the account and transaction fee signal to be paid for operation of gaming machine 1. Then, communications device 5 receives radio signal to retrieve holder's account number in radio signal and also receive a monetary signal indicative of transaction fee that may be involved in radio signal. Alternatively, communications device 5 may be connected to an entry device 25 for inputting a monetary signal of a transaction fee for gaming machine 1 to transmit monetary signal from entry device 25 to communications device 5. Then, payment device 6 may receive monetary signal from entry device 25 through communications device 5 simultaneously with, before or after receiving radio signal from mobile terminal 10. Then, just like through an on-line debit or prepaid card system, payment device 6 may withdraw the amount of transaction fee from holder's account at financial database 7 when the amount of transaction fee is within a deposit balance of the account. Then, payment device 6 produces an authorization signal to communications device 5 that then sends the monetary signal to gaming machine 1 to drive it.

In another embodiment of the present invention, remotely operable signal may include PIN and/or ID numbers to more strictly identify the holder in addition to the holder's account number of mobile terminal 10 to increase security against unauthorized access to the holder's account. When mobile terminal 10 emits radio signal inclusive of account number and PIN and/or ID number, communications device 5 may receive radio signal, retrieve account number and PIN and/or ID numbers from radio signal and withdraw the amount of transaction fee from holder's account at financial database 7 when PIN and/or ID numbers correspond to one or ones of pass-codes or secret numbers at financial database 7. In lieu of PIN and/or ID number included in radio signal, entry device 25 may be used to produce PIN and/or ID number signals from entry device 25 connected to communications device 5 to feed them to payment device 6 through communications device 5 so that payment device 6 may withdraw the amount of transaction fee from holder's account at financial database 7 when PIN and/or ID numbers correspond to one or ones of pass-codes or secret numbers at financial database 7.

In a further embodiment of the instant invention, communications device 5 may be connected to a visual and/or acoustic display device 20. When communications device 5 receives authorization signal from payment device 6, it produces and transmits a deal signal to mobile terminal 10 and/or to display device 20 to exhibit deal signal thereon. On another aspect, when communications device 5 fails to retrieve account number in radio signal or retrieves incorrect account number, payment device 6 produces an unauthorized signal to communications device 5 that then produces and forwards a no-deal signal to mobile terminal 10 and/or to display device 20 for exhibition of no-deal signal.

For example, when drive device 3 has completed its program-controlled operation or when a force-quit button 24 is operated to terminate the game, drive device 3 generates a refund money signal of an unspent remaining amount, award, prize or jackpot obtained from the game if any. Drive device 3 may transmit refund money signal and management code signal to printer 11 and also to signal processor 5b of communications device 5 to store money amount to be refunded in signal processor 5b. Signal processor 5b may also transmit refund money signal to reception means 33 of mobile terminal 10 through communications interface 5a so that mobile terminal 10 may receive and write the refund money signal in memory means 34 of mobile terminal 10 to add money amount in memory means 34. Printer 11 may record data on the refund money signal and necessary management code signals from drive device 3 on recording medium or media and prepares a coupon of recording media for dispensation of the coupon from printer 11. In this way, a mutual intercommunication system may be established to transport and receive electronic signals between mobile terminal 10 and signal processor 5b through wired, wireless or radio or optical connection. Specifically, communications interface 5a may receive remotely operable signal from mobile terminal 10, and transmit it to signal processor 5b that may receive remotely operable signal from communications interface 5a. Signal processor 5b may also retrieve and produce signals of account number or debit card number for identifying the account owner or holder and the holder's PIN and/or ID number and monetary signals or a denomination signal contained in remotely operable signal and may then send the information to payment device 6.

Figure 3:
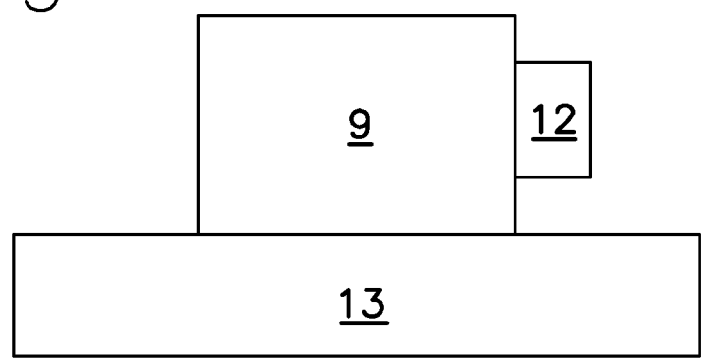
FIG. 3 is a schematic diagram showing a stacker removed from the gaming machine and arranged on a reading device to retrieve information from a memory device attached to the stacker in the non-contact condition of the memory device with the reading device.

After or before bills are extracted from stacker 9, it is put on a readout device 13 as shown in FIG. 3, but memory device 12 attached to stacker 9 is retained in the non-contact condition away from readout device 13 that may be operated to retrieve the following four kinds of information stored in memory device 12:

(i) Total amount and total number of bills stowed in stacker 9;

(ii) All denomination signals of bills;

(iii) All account numbers that identify account holders involved; and (iv) The specific code signal identifying gaming machine 1 from which stacker 9 has been removed.

The information readout device 13 has retrieved from memory device 12 is compared with the information of bills removed from stacker 9 and with the information from communications device 5 to inspect whether or not they match.

In still another embodiment, gaming machine 1 may comprise an entry device made up of a plurality of choice switches, namely entry device 25 such as image switches on a display screen or made up of mechanical selector switches to be chosen to determine a denomination of bills for payment for games so that one or more of choice switches may be selected to determine one or more of different charge amounts to be paid for gaming to transmit one or more charge or denomination signals to signal processor 5b of communications device 5. On the other hand, when mobile terminal 10 transmits to communications device 5 remotely operable signal including holder's account number signal, communications interface 5a may receive account number signal from mobile terminal 10, and signal processor 5b may receive chosen charge signal from entry device 25 and holder's account number signal transmitted from mobile terminal 10.

In operation of gaming machine 1, a user may select either cash or electronic payment for games with gaming machine 1. Selecting electronic payment, he or she may operate entry means 31 of mobile terminal 10 to input money amount of gaming fees into CPU 35 that may synthesize a remotely operable signal by placing on a carrier wave the money amount of gaming fees and account number signal stored in memory means 34 and then transmit remotely operable signal to communications device 5 through transmission means 32. In this way, user may move closer to gaming machine 1 and allow mobile terminal 10 to lightly touch communications interface 5a while making mobile terminal 10 produce and transmit remotely operable signal from mobile terminal 10.

Figure 4:
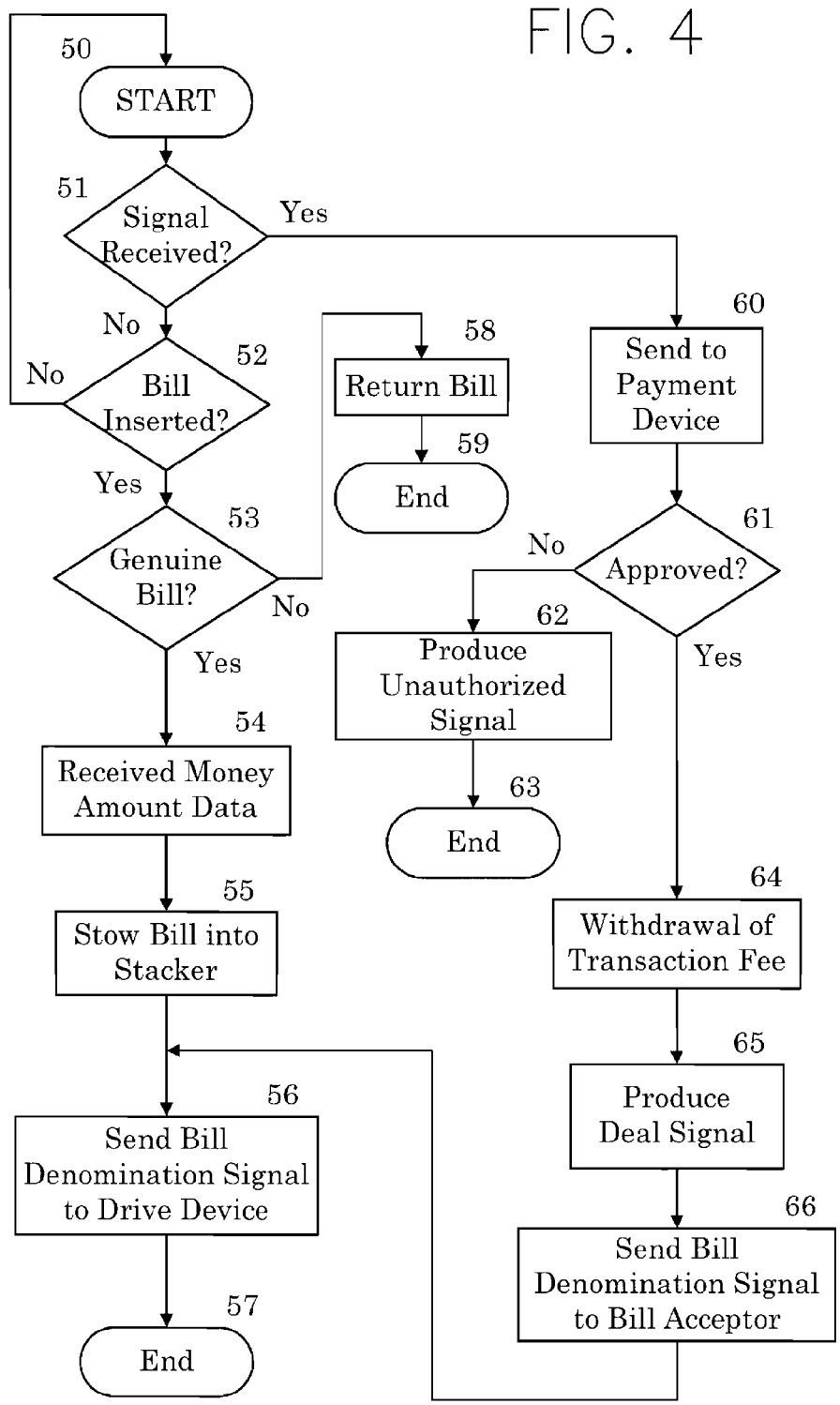
FIG. 4 is a flow chart indicating an operational sequence of the gaming machine according to the present invention.

Then, FIG. 4 is a flow chart indicating further processing subsequent to transmission of remotely operable signal from mobile terminal 10 where processing moves on from Step 50 to 51, and so, signal processor 5b determines whether to receive remotely operable signal from mobile terminal 10. Receiving remotely operable signal through communications interface 5a in Step 51, procedure goes to Step 60 where signal processor 5b retrieves account number signal and monetary signal from remotely operable signal when remotely operable signal contains both account number and monetary signals. As mentioned before, in lieu of transmission of monetary signal from mobile terminal 10, monetary signal may be produced from entry device 25 to signal processor 5b. Then, signal processor 5b sends them to payment device 6 that receives account number and monetary signals and gains access to financial database 7 in Step 61 to determine whether the holder's account is legitimate and the amount of transaction fee is within a deposit balance of the account. When payment device 6 approves holder's account as legitimate and amount of transaction fee as being within a deposit balance of the account, it may withdraw the amount of transaction fee from holder's account at financial database 7 (Step 64).

Subsequently, payment device 6 produces a deal signal and a denomination signal as a monetary signal to signal processor 5b (Step 65) that then receives denomination signal; converter 5c converts denomination signal into a serial denomination signal to control device 8 of bill acceptor 4 that may receive serial signal in Step 66; and then, control device 8 transmits denomination signals to drive device 3 (Step 56). This allows drive device 3 to produce drive signals of the amount corresponding to denomination signal in accordance with built-in program in drive device 3, and sends drive signals to game hardware 2 to conduct a game. Then, gaming hardware 2 stops its operation in Step 57.

In Step 61, when payment device 6 does not approve holder's account because of incorrect account number or amount of transaction fee as being out of a deposit balance at the account, payment device 6 produces an unauthorized signal to communications device 5 that produces no-deal signal to mobile terminal 10 and display device 25 and finishes all procedure in Step 63. If remotely operable signal contains PIN and/or ID number, payment device 6 also decides whether it corresponds to one of pass-codes or secret number in financial database 7 in addition to identification of holder's account number at financial database 7. When PIN and/or ID number corresponds to pass-codes or secret numbers, payment device 6 produces an authorized signal, but, adversely, PIN and/or ID number does not correspond to pass-codes or secret numbers payment device 6 produces an unauthorized signal.

Game hardware 2 may include all money-operated electronic gaming machines such as slot machines provided with any drive device for generating drive signals after payment by denomination signals of bills considered genuine by bill acceptor 4. Control device 8 may retain its memory area the amount of transaction fee, holder's account number of financial database 7 and specific code identifying gaming machine and also transmit and write these information in memory device 12 attached to stacker 9. When payment device 6 makes unauthorized decision on payment in Step 61, it produces an unauthorized signal on payment to signal processor 5*b* (Step 62) to cease operations (Step 63).

On the other hand, when user selects cash payment, processing also begins with Step 50 in FIG. 4 and goes to Step 51 where without electronic signals received by signal processor 5*b*, and he or she inserts a bill or bills into bill acceptor 4 in Step 52, and, control device 8 receives detection signal from inlet sensor 21, while considering on whether inserted bill is genuine or not in Step 53. When control device 8 determines the bill to be inauthentic, it drives conveyor in the reverse direction to return bill to inlet of bill acceptor 4 (Step 58), and ceases the operation in Step 59. Adversely, when control device 8 considers bill to be genuine in Step 53, it determines the amount of bill (Step 54); stacker 9 stows the bill therein (Step 55); control device 8 forwards its denomination signal to drive device 3 (Step 56) to perform continuous operations and to stop the operation (Step 57). In this way, communications device 5 allows for cashless operation of gaming machine after verification of the monetary signal in remotely operable signal received from mobile terminal 10.

When drive device 3 has completed its program-controlled operation or when a player operates a force-quit button 24, drive device 3 immediately causes gaming hardware 2 to cease the game, and at the same time, drive device 3 generates and transmits to communications device 5 and printer 11 management codes and a refund money signal of an unspent remaining amount or payback amount data such as award, prize or jackpot obtained from the game if any, and communications device 5 transmits the refund money signal to mobile terminal 10. Then, printer 11 prints refund money signal on a printing media and dispenses a coupon thereof. In lieu of or in addition to dispensing a coupon, drive device 3 may send refund or payback amount data to communications device 5 that may convert the received refund money signal into a predetermined format and send them to mobile terminal 10. In this way, this system is very convenient because users can obtain goods or services from automated machine by real-time electronic payment for transaction while an operator of the automated machine can surely receive a payment without credit transaction.

Figure 5:
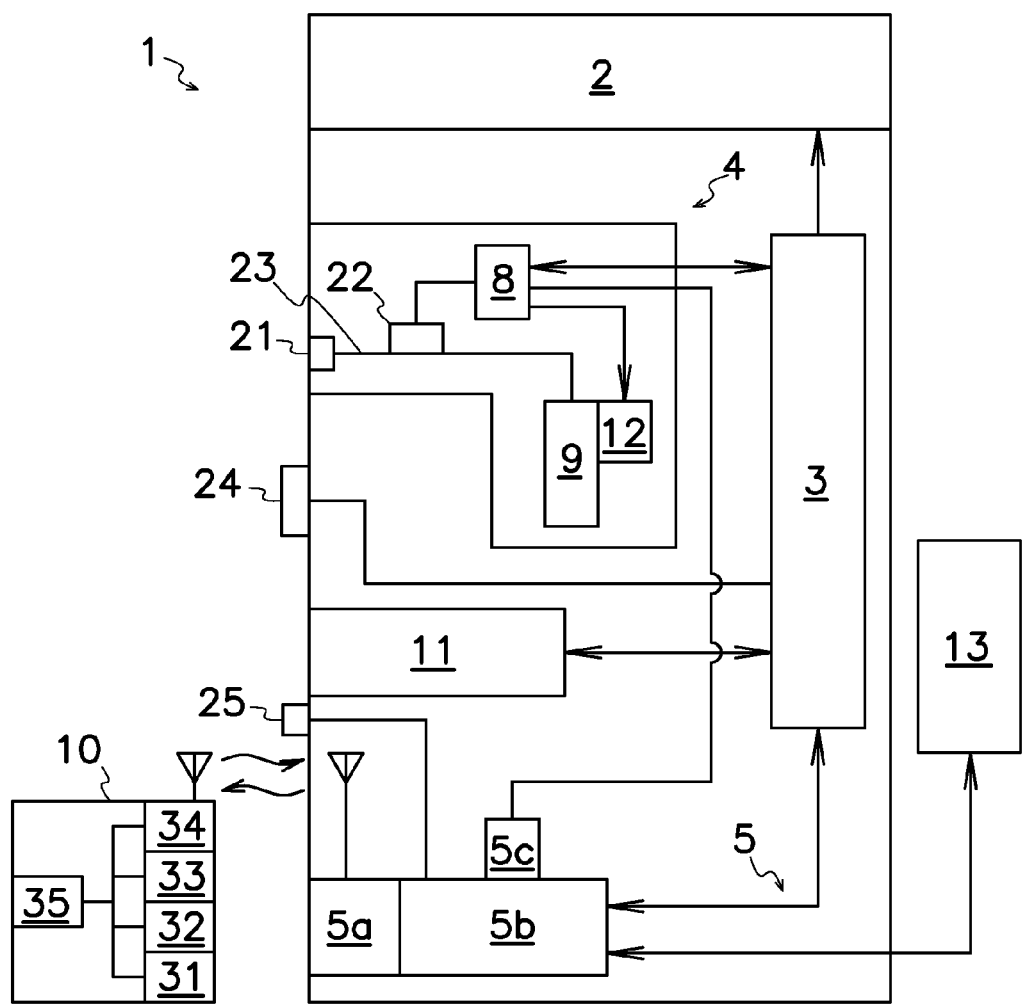
FIG. 5 is a schematic diagram showing a second embodiment of the gaming machine of prepaid card transaction type according to the present invention.

FIG. 5 is a block diagram schematically showing another embodiment of the electronic payment system of prepaid type without automatic payment device 6 according to the present invention applied to gaming machine. In this embodiment, memory means 34 of mobile terminal 10 stores an electronic amount signal of prepaid money and at least one specific signal of PIN and ID numbers for identifying a holder of mobile terminal 10. Transmission means 32 of mobile terminal 10 emits a remotely operable signal including the at least one specific signal. A storage device 13 stores at least one of users' PIN and ID. Communications device 5 is connected to automated machine 1 and receives remotely operable signal emitted from mobile terminal 10 to retrieve at least one specific signal in remotely operable signal. Communications device 5 also receives a monetary signal indicative of a transaction fee necessary to drive automated machine 1 simultaneously with, before or after receiving remotely operable signal. Monetary signal may be contained in remotely operable signal so that it may be emitted from mobile terminal 10 and received by communications device 5. Otherwise, monetary signal may be produced by entry device 25 to communications device 5. When communications device 5 decides that monetary signal and at least specific signal are valid as a result of comparing the at least specific signal with that stored in storage device 13, communications device 5 produces monetary signal to drive automated machine 1 and also produces a deduction signal of transaction fee to mobile terminal 10. Subsequently, mobile terminal 10 receives deduction signal from communication device 5 to deduct transaction fee from prepaid money amount in memory means 34.

INDUSTRIAL APPLICABILITY

The present invention is applicable to electronic payment systems for automated machines such as gaming machines, automated teller machines, vending machines, money exchangers or other money-operated equipment or apparatus.

What is claimed are:

1. An electronic payment system comprising:
a mobile terminal having:
    a memory for storing an electronic amount signal of prepaid money and at least one specific signal of PIN and ID numbers for identifying a holder of the mobile terminal,
    a transmission device for emitting a remotely operable signal including the at least one specific signal, and
    a reception device connected to the memory,
a storage device for storing at least one of users' PIN and ID numbers,
a bill acceptor for validating a bill inserted from outside to produce a monetary signal when the bill acceptor decides that the inserted bill is genuine, and
an automated machine being a gaming machine that comprises a drive device connected to the bill acceptor and gaming hardware drivingly connected to the drive device, and
a communications device for receiving the remotely operable signal emitted from the mobile terminal to retrieve the at least one specific signal in the remotely operable signal and for also receiving a monetary signal indicative of a transaction fee necessary to drive the automated machine simultaneously with, before or after receiving the remotely operable signal, the monetary signal being either contained in the received remotely operable signal or transmitted from an entry device provided in the automated machine, wherein the communications device produces the received monetary signal and a deduction signal of the transaction fee to the mobile terminal, when the communications device decides that the monetary signal and the at least specific signal are valid as a result of comparing at least corresponding one specific signal from the mobile terminal with at least one of users' PIN and ID numbers stored in the storage device, the communications device forwards the received monetary signal to the bill acceptor and forwards the deduction signal to the reception device of the mobile terminal, the bill acceptor forwards to the drive device both of the monetary signals that the bill acceptor produces and receives from the communications device, the drive device generates to the gaming hardware drive signals of the amount equivalent to the value of the transaction fee to allow the gaming hardware to conduct a game, and the reception device in the mobile terminal receives the deduction signal from the communications device to deduct the transaction fee from the prepaid money amount in the memory.

2. The electronic payment system of claim 1, wherein the mobile terminal transmits to the communications device the monetary signal that indicates a money amount corresponding to one or more of denominations of bills optically or magnetically readable by the bill acceptor.

3. The electronic payment system of claim 1, herein the monetary signal indicates a money amount corresponding to each denomination of bills optically or magnetically readable by the bill acceptor.

4. The electronic payment system of claim 1, wherein the drive device generates and transmits to the communications device a refund money signal of an unspent remaining amount, award, prize or jackpot obtained from the game if any when the drive device has completed its program-controlled operation or when a force-quit button is operated to terminate the game, and the communications device transmits the refund money signal to the mobile terminal.

5. The electronic payment system of claim 1, further comprising a printer for recording game information on a recording medium, wherein the printer records data on the refund money signal from the drive device on the recording medium and prepares a coupon of the recording medium for dispensation of the coupon from the printer.

* * * * *